(12) United States Patent
Chen et al.

(10) Patent No.: US 12,216,281 B2
(45) Date of Patent: Feb. 4, 2025

(54) POSITION-BASED SWITCH OF DISPLAY DEVICES

(71) Applicant: HEWLETT-PACKARD DEVELOPMENT COMPANY, L.P., Spring, TX (US)

(72) Inventors: Chung-Chun Chen, Taipei (TW); Ming-Shien Tsai, Taipei (TW); Chih-Ming Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 199 days.

(21) Appl. No.: 17/973,324

(22) Filed: Oct. 25, 2022

(65) Prior Publication Data

US 2024/0134193 A1 Apr. 25, 2024
US 2024/0231092 A9 Jul. 11, 2024

(51) Int. Cl.
*G02B 27/00* (2006.01)
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 11,227,481 B1* | 1/2022 | Bran | G08B 21/245 |
| 11,503,358 B1* | 11/2022 | Agrawal | H04N 21/4858 |
| 11,520,550 B1* | 12/2022 | Bushnell | H04R 5/04 |
| 11,606,456 B1* | 3/2023 | Kumar Agrawal | G06F 1/1694 |
| 2017/0367766 A1* | 12/2017 | Mahfouz | A61B 8/4472 |
| 2018/0265040 A1* | 9/2018 | Nowottnick | B60R 25/24 |
| 2022/0201428 A1* | 6/2022 | Ertan | G06F 21/44 |
| 2022/0244367 A1* | 8/2022 | Shin | G01S 11/04 |
| 2023/0289199 A1* | 9/2023 | Hou | G06F 3/03541 |

* cited by examiner

*Primary Examiner* — Martin Mushambo
(74) *Attorney, Agent, or Firm* — Quarles & Brady LLP

(57) ABSTRACT

The present specification describes examples of position-based switching of display devices. An example augmented reality (AR) device includes an AR display device to render display data. The example AR device also includes a wireless communication device to transmit and receive wireless signals. The example AR device further includes a processor to: 1) determine a position of the AR device relative to a computing device based on wireless signals communicated with the computing device; and 2) switch an activity state of the AR display device based on the determined position of the AR device relative to the computing device.

17 Claims, 4 Drawing Sheets

POSITION-BASED SWITCH OF DISPLAY DEVICES

BACKGROUND

Computing devices provide the ability to present information to a user. For example, image data may be presented on a display screen. In augmented reality systems, a user may become immersed in an extended reality environment wherein the user can interact with an enhanced environment. Augmented reality systems allow users to interact with real and/or perceived aspects of an environment to observe, manipulate, and/or interact with that environment.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
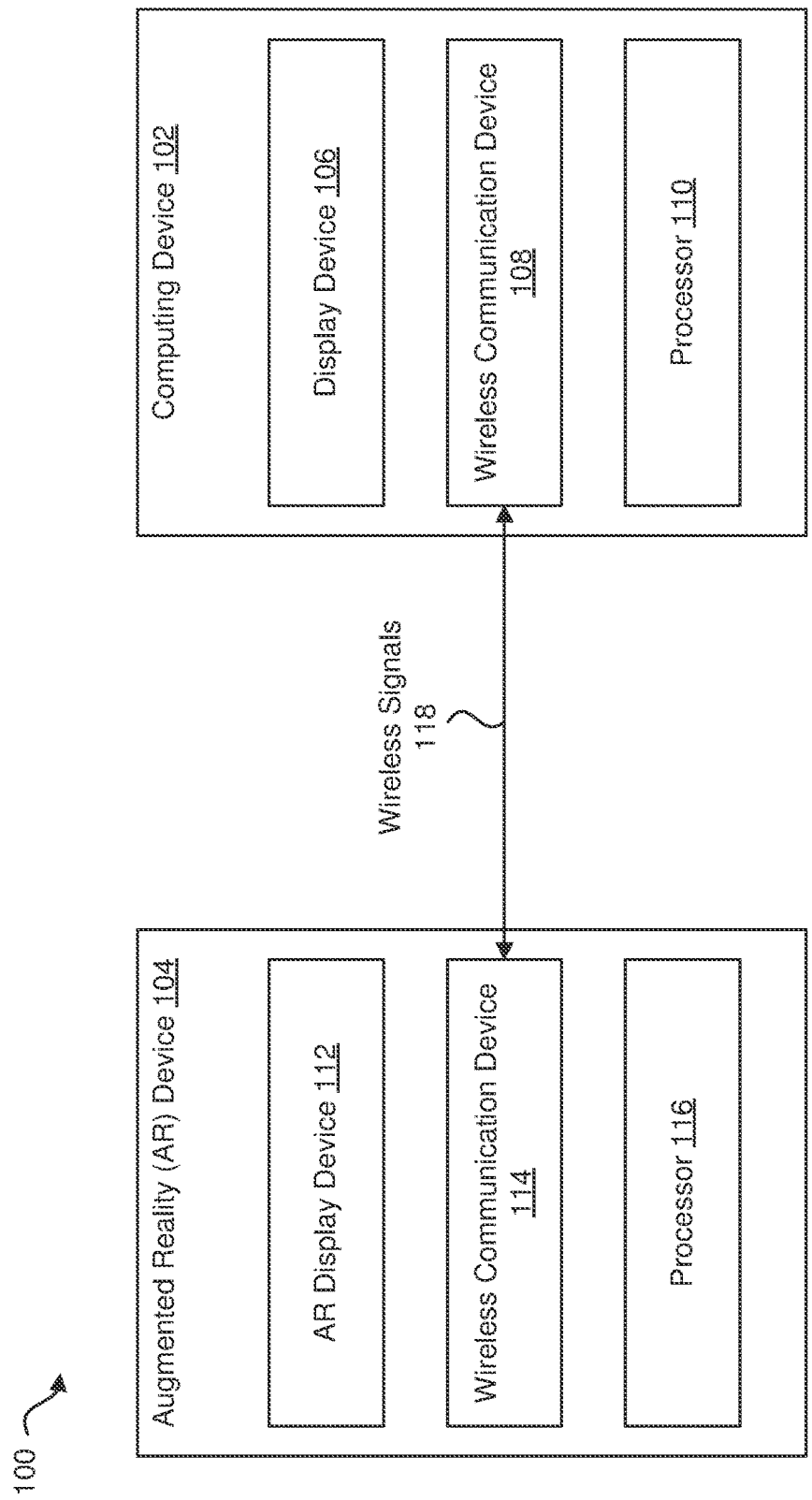
FIG. 1 is a block diagram of a system for switching between displays of a computing device and an augmented reality (AR) device according to an example of the principles described herein.

Throughout the drawings, identical reference numbers designate similar, but not necessarily identical, elements. The figures are not necessarily to scale, and the size of some parts may be exaggerated to more dearly illustrate the example shown. Moreover, the drawings provide examples and/or implementations consistent with the description; however, the description is not limited to the examples and/or implementations provided in the drawings.

DETAILED DESCRIPTION

Augmented reality (AR) provides a way for a user to view a real-world environment with computer-generated display data. For example, an AR device may include a transparent lens through which a user may observe their surroundings. An AR display device may cause display data (e.g., an image) to be displayed on the transparent lens such that the user perceives the display data.

Examples of AR devices include head-mounted display devices that are worn by a user. Such head-mounted display devices include eyewear (e.g., eyeglasses, contact lenses, goggles, etc.) and helmet-mounted display devices. With these examples of head-mounted AR devices, display data is projected through or reflected off of the transparent lenses of the AR device.

In some examples, a user may use an AR device in conjunction with a separate computing device. Examples of computing devices include computing device 102 may be any type of computing device including desktop computers, laptop computers, all-in-one computing devices, personal digital assistants (PDAs), mobile devices, smartphones, gaming systems, tablets, among other electronic devices. The computing device may include a display device for presenting display data (e.g., an image) to a user. For example, the computing device may include a display screen (e.g., monitor, touchscreen, etc.) that can display images.

In some cases, a user may simultaneously use an AR device with a computing device. For example, a user may start a program (e.g., a video conference application) on the computing device. Display data for the program may be presented on a display screen of the computing device.

In this example, while the program is running, the user may be wearing an AR device that is connected to the computing device. The AR device may be capable of receiving a video stream from the computing device. Upon receiving the video stream, the AR device may display the display data for view by the user. For example, the video stream may be a desktop image from the computing device.

In this example, a user may want to view the display screen of the computing device when in proximity to the computing device. In this case, it may be desirable to suspend the display by the AR device to avoid redundant and/or confusing duplication of display data by both the computing device and the AR device. However, if the user moves away from the computing device or turns their head away from the display screen, the AR device may present the display data to the user. Thus, display operations may be switched between the computing device and the AR device based on the position of the AR device relative to the computing device.

The present specification provides examples of switching between the computing device and the AR device for display data. These examples may decrease energy use by the computing device and/or AR device by activating and suspending the display of information based on the position of the AR device relative to the computing device. Furthermore, the described examples may improve user experience as a user may change their pose or position relative to the computing device while maintaining a continuous display of information. The automatic switching of displays between the computing device and the AR device may further enhance the user's comprehension of the display data as overlapping and/or redundant displays of information are avoided.

The present specification describes an example AR device that includes an AR display device to render display data. The example AR device also includes a wireless communication device to transmit and receive wireless signals. The example AR device further includes a processor to: 1) determine a position of the AR device relative to a computing device based on wireless signals communicated with the computing device; and 2) switch an activity state of the AR display device based on the determined position of the AR device relative to the computing device.

The present specification also describes an example computing device that includes a display device to render display data. The example computing device also includes a wireless communication device to transmit and receive wireless signals with an AR device that includes an AR display device. The example computing device further includes a processor to: 1) determine a position of the AR device relative to the computing device based on the wireless signals communicated with the AR device; and 2 switch an activity state of the display device based on the determined position of the AR device relative to the computing device.

The present specification further describes a system that includes an AR device and a computing device. The example AR device includes an AR display device and a first wireless communication device to transmit and receive wireless signals. The example computing device includes a display device to render display data; a second wireless communication device to transmit and receive wireless signals with the AR device; and a processor to: 1) determine a distance of the AR device from the computing device based on the wireless signals; 2) determine an angle of the AR device relative to the computing device based on the wireless signals; and 3) switch an activity state of the display device and the AR display device based on the determined distance and the angle of the AR device relative to the computing device.

As used in the present specification and in the appended claims, the term "processor" may be a processor resource, a controller, an application-specific integrated circuit (ASIC), a semiconductor-based microprocessor, a central processing unit (CPU), and a field-programmable gate array (FPGA), and/or other hardware device that executes instructions.

As used in the present specification and in the appended claims, the term "memory" may include a non-transitory computer-readable storage medium, where the computer-readable storage medium may contain, or store computer-usable program code for use by or in connection with an instruction execution system, apparatus, or device. The memory may take many types of memory including volatile memory (e.g., RAM) and non-volatile memory (e.g., ROM).

Turning now to the figures, FIG. 1 is a block diagram of a system 100 for switching between displays of a computing device 102 and an augmented reality (AR) device 104 according to an example of the principles described herein. The computing device 102 may be any type of computing device including a desktop computer, a laptop computer, a personal digital assistant (PDAs), mobile device, smartphone, gaming system, tablet, among other electronic devices.

The computing device 102 may include a display device 106 to render display data. For example, the display device 106 may present visual images for viewing by a user, Examples of the display device 106 include a monitor, touch screen display screen, a projector, etc. In some examples, the display device 106 may be integrated with the computing device 102, as in the case of a laptop computer or tablet computer. In some examples, the display device 106 may be separate from the computing device 102, as in the case of a desktop computer.

The computing device 102 may include a wireless communication device 108 to transmit and receive wireless signals 118 with the AR device 104. In some examples, the wireless communication device 108 may communicate using radio frequency (RF) transmissions. In some examples, the wireless communication device 108 may be an ultra-wideband (UWB) radio device in which the wireless communication device 108, A UWB radio device may transmit and/or receive information across a wide bandwidth (e.g., greater than 500 MHz). This wide bandwidth allows for the transmission of a large amount of signal energy without interfering with narrowband transmissions or carrier wave transmissions in the same frequency band.

In some examples, the wireless communication device 108 may determine the position of the computing device 102 relative to another wireless communication device (e.g., AR device 104). For example, a UWB radio may determine a distance or angle relative to a second UWB radio. In some examples, the wireless communication device 108, (e.g., using UWB technologies) may determine distance between a second device using the time-of-flight (ToF) or Time Difference of Flight (TDoF) for wireless signals 118. The wireless communication device 108, (e.g., using UWB technologies) may determine an angle between a second device using an angle of arrival (AoA) or angle of departure (AoD) determination based on a measurement of phase difference at multiple receiver antennas. In some examples, UWB technology provides for a high-degree of accuracy in determining the position of a device relative to a second device, as compared to other wireless communication technologies.

In some examples, the computing device 102 includes a processor 110. The processor 110 may execute computer readable program code to perform display switching as described herein.

In an example, the computing device 102 and/or AR device 104 may include a data storage device (not shown). The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor 110 may boot from Read Only Memory (ROM), maintain non-volatile storage in the Hard Disk Drive (HDD) memory, and execute program code stored in Random Access Memory (RAM). The data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Rash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

Referring now to the AR device 104, the AR device 104 may include a display (referred to herein as an AR display device 112) to render display data. For example, the AR device 104 may include a transparent lens through which a user may look. The AR display device 112 may cause display data to be projected on or displayed within the transparent lens. In some examples, the AR display device 112 may include a projector (e.g., a micro-projector) to project images onto the transparent lens.

The AR device 104 may also include a wireless communication device 114. In some examples, the wireless communication device 114 of the AR device 104 may be a UWB radio device. As described above with the computing device 102, the AR device 104 may use the wireless communication device 114 to determine the position of the AR device 104 relative to the computing device 102 (or other device). For example, the wireless communication device 114 may determine distance to another device (e.g., the computing device 102) based ToF or TDoF for wireless signals 118 sent or received from the computing device 102. The AR device 104 may use the wireless communication device 114 to determine an angle between a second device using an AoA or AoD determination based on wireless signals 118 sent or received from the computing device 102. In some cases, the present specification refers to the wireless communication device 114 of the AR device 104 as the "first wireless communication device" and the wireless communication device 108 of the computing device 102 as the "second wireless communication device."

In some examples, the AR device 104 includes a processor 116. The processor 116 may execute computer readable program code to perform display switching as described herein.

Returning now to the computing device 102, the computing device 102 may perform display switching with the AR device 104. In some examples, computing device 102 may instruct the AR device 104 when the AR device 104 is to activate and deactivate the AR display device 112 based on the position of the AR device 104 relative to the computing device 102. Furthermore, the computing device 102 may activate and deactivate its own display device 106 based on the position of the AR device 104 relative to the computing device 102. In some examples, the display switching may be based on the position of the AR device 104 relative to the display device 106 of the computing device 102 in the case where the display device 106 is external to the computing device 102.

The processor 110 may determine a position of the AR device 104 relative to the computing device 102 based on the wireless signals 118 communicated with the AR device 104. For example, the computing device 102 and the AR device 104 may establish a communication link in which wireless signals 118 are transmitted and received. The processor 110 may query the wireless communication device 108 of the computing device 102 to determine the position (e.g., the distance and/or angle) of the AR device 104 relative to the computing device 102. For example, as described above, the wireless communication device 108 may use UWB technology to determine the distance and/or angle of the AR device 104 relative to the computing device 102.

Figure 2B:
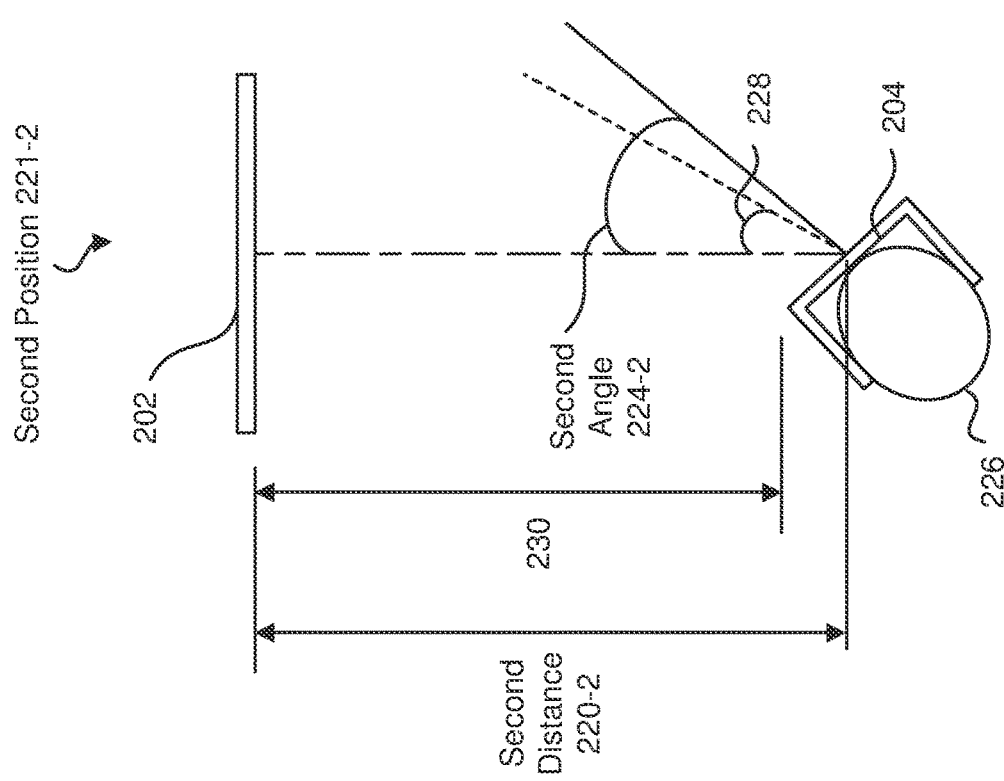
FIGS. 2A and 2B illustrate examples of determining the position of the computing device and the AR device, according to an example.
Figure 2A:
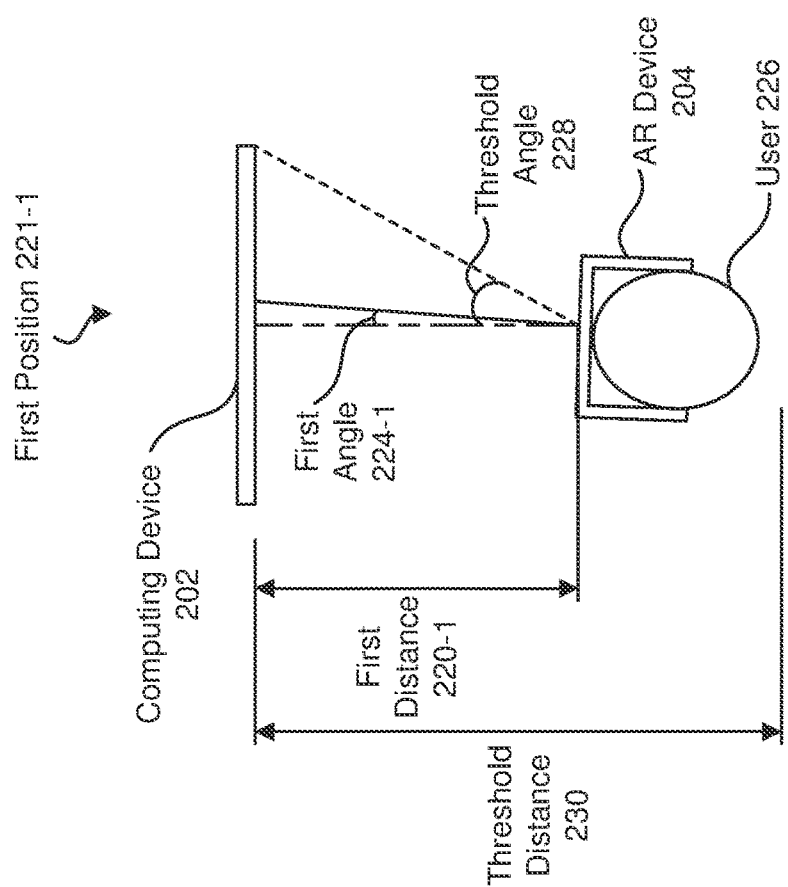

The wireless communication device 108 may update the processor 110 on the position of the AR device 104. For example, the processor 110 may determine the distance of the AR device 104 from the computing device 102 based on the wireless signals 118. The processor 110 may also determine an angle of the AR device 104 relative to the computing device 102 based on the wireless signals. FIGS. 2A and 2B illustrate examples of determining the position of the computing device and the AR device.

Referring briefly to FIGS. 2A and 2B, a user 226 may wear AR device 204 that is in wireless communication with a computing device 202. For example, in FIG. 2A, the user 226 is in a first position 221-1 with respect to the computing device 202 (e.g., a laptop computer). In FIG. 2B, the user 226 is in a second position 221-2 with respect to the computing device 202. For example, the user 226 may move away from their laptop computer or may look away from their laptop computer, Therefore, depending on the location of the user 226 or the head position (e.g., pose) of the user 226, the position of the AR device 204 relative to the computing device 202 may change.

In some examples, the computing device 202 and/or the AR device 204 may determine the distance between each other. For example, the computing device 202 and/or the AR device 204 may use UWB technology to determine the TOF or TDOF for wireless signals. Thus, the AR device 204 may be expected to be within a given range of distances when the user 226 is seated at the computing device 202. The threshold distance 230 may be the maximum distance that a user may be located and still be considered close enough to the computing device 202 to view the display device of the computing device 202. If the distance 220 between the AR device 204 and the computing device 202 is greater than the threshold distance 230, then it may be assumed that the user 226 is not viewing the display device (e.g., FIG. 1, 106) of the computing device 202. For example, if the user 226 stands up to move across the room to retrieve an item, then the distance between the computing device 202 and the AR device 204 may be greater than the threshold distance 220-1.

In some examples, the computing device 202 and/or the AR device 204 may determine the angle of the AR device 204 relative to the computing device 202. For example, the computing device 202 and/or the AR device 204 may use UWB technology to determine the AoA or AoD for wireless signals. When the user 226 is seated at the computing device 202 and looking at the display of the computing device 202, the AR device 204 may be expected to be within a given range of angles. The threshold angle 228 may be the maximum angle (expressed in terms of absolute value) that the AR device may face relative to the computing device to consider the user 226 to be looking at the display device of the computing device 202. If the angle 224 of the AR device 204 relative to the computing device 202 is greater than the threshold angle 228, then it may be assumed that the user 226 is not viewing the display device (e.g., FIG. 1, 106) of the computing device 202. For example, if the user 226 turns their head to the side or stares at the ceiling, then the angle 224 may be greater than the threshold angle 228.

In FIG. 2A, the user 226 is in a first position 221-1 defined by a first distance 220-1 and a first angle 224-1. In this case, the first distance 220-1 is within (e.g., less than) the threshold distance 230, Furthermore, the first angle 224-1 is within (e.g., less than) the threshold angle 228.

In FIG. 2B, the user 226 is in a second position 221-2 defined by a second distance 220-2 and a second angle 224-2. In this case, the second distance 220-2 is greater than the threshold distance 230. Furthermore, the second angle 224-2 is greater than the threshold angle 228.

It should be noted that in the case of a display device (e.g., FIG. 1, 106) that is external to the computing device 202, the distance and angle may be determined relative to the host computing device 202 (e.g., laptop computer, desktop computer, gaming console, etc.) that is driving the external display device 106. For example, an external display device 106 is likely to be located within a given distance from the computing device 202. In this case, the threshold distance 230 and threshold angle 228 may be set for an external display device case. For example, the distance and angle of the AR device 204 may be determined relative to the computing device 202. However, the threshold distance 230 and threshold angle 228 for the external display device case may be greater than the threshold distance 230 and threshold angle 228 for the case when the display device is integrated with the computing device 202. Thus, the threshold distance 230 and threshold angle 228 may be greater for the external display device case to account for the increased distance of the external display device 102 from the computing device 202.

In some examples, the threshold distance 230 and threshold angle 228 may be calibrated for the external display device case. For example, a baseline distance and baseline angle of the AR device 204 relative to the computing device 202 may be recorded when the user 226 faces the external display device 106. This may be accomplished through a user interface (e.g., graphical user interface) in which the user 226 indicates that they are located near and viewing the external display device 106. This measured baseline distance and baseline angle may be used to account for offsets in the external display device 106 from the computing device 202, such as when the external display device 106 is placed to the side of the computing device 202. Once the computing device 202 establishes the baseline distance and baseline angle for the external display device 106, the computing device 202 may switch between displaying on the external display device 106 or the AR device 204 based on the changes in the distance and angle of the AR device 204 from the baseline distance and baseline angle.

Returning now to FIG. 1, the processor 110 may switch an activity state of the display device 106 and/or the AR display device 112 based on the determined position of the AR device 104 relative to the computing device 102. For example, the processor 110 may switch an activity state of the display device 106 and/or the AR display device 112 based on the determined distance and/or the angle of the AR device 104 relative to the computing device 102. As used herein, the term "activity state" refers to whether a display device is ON or OFF. When a display device (e.g., display device 106, AR display device 112) is switched ON, the display device may receive power and may render display data for view by a user. When a display device (e.g., display device 106, AR display device 112) is switched OFF, the display device may enter a low power state where power to the display device may be disconnected. In some examples, when a display device is switched OFF, certain components (e.g., graphics processors, encoders/decoders) may be disabled while other components of the display device remain active.

In response to determining that the position of the AR device 104 is within (e.g., less than or equal to) a threshold position, the processor 110 of the computing device 102 may switch ON the display device 106 of the computing device 102 and send an instruction to the AR device 104 to switch OFF the AR display device 112. For example, in response to determining that the distance of the AR device 104 is within a threshold distance and the angle of the AR device 104 is within a threshold angle, the processor 110 may switch ON the display device 106. The processor 110 may then send an instruction to the AR device 104 to switch OFF the AR display device 112. In this case, the computing device 102 may present the display data for view by the user. Because the AR display device 112 is switched OFF, the AR device 104 may conserve power.

In some examples, the processor 110 may determine that the position of the AR device 104 is outside a threshold position. For example, the processor 110 may determine that the distance of the AR device 104 is greater than a threshold distance, or the angle of the AR device 104 is greater than a threshold angle.

In response to determining that the position of the AR device 104 is outside a threshold position (e.g., the distance of the AR device 104 is greater than a threshold distance, or the angle of the AR device 104 is greater than a threshold angle), the processor 110 may switch OFF the display device 106 of the computing device 102. The processor 110 may then send an instruction to the AR device 104 to switch ON the AR display device 112. The processor 110 may send (e.g., using the wireless communication device 108) display data to the AR device 104 to render using the AR display device 112. In some examples, the display data may include a video stream of a desktop image from the computing device 102. For instance, instead of displaying a view of a desktop environment on the display device 106 of the computing device 102, the desktop environment may be displayed by the AR display device 112. In this case, the computing device 102 may conserve power by turning OFF the display device 106 when the user is not near the computing device 102 or not looking toward the computing device 102.

In some examples, the processor 110 may periodically request the wireless communication device 108 of the computing device 102 to calculate the distance and the angle of the AR device 104 relative to the computing device 102. For example, while the AR device 104 is connected to the computing device 102, the processor 110 may make periodic requests to the wireless communication device 108 of the computing device 102 to calculate the distance and the angle of the AR device 104. In this manner, the processor 110 may determine whether a user wearing the AR device 104 is near the computing device 102 and looking toward the computing device 102.

In the example above, the computing device 102 provided an instruction to the AR device 104 to switch the state of the AR display device 112. In another example, the AR device 104 may switch the state of the AR display device 112 based on its own determination of the position of the AR device 104 relative to the computing device 102. For example, the processor 116 of the AR device 104 may use UWB technology of the wireless communication device 114 to determine a position of the AR device 104 relative to the computing device 102 based on the wireless signals 118 communicated with the computing device 102, as described above. The position of the AR device 104 relative to the computing device 102 may include the distance of the AR device 104 from the computing device 102. In another example, the position of the AR device 104 relative to the computing device 102 includes an angle of the AR device 104 relative to the computing device 102.

The processor 116 of the AR device 104 may switch the activity state of the AR display device 112 based on the determined position of the AR device 104 relative to the computing device 102. For example, the processor 116 may switch OFF the AR display device 112 in response to determining that the position (e.g., distance, angle) of the AR device 104 is within a threshold position (e.g., threshold distance, threshold angle). In this case, the AR device 104 determines that it is near the computing device 102 and the user is facing the computing device 102.

In some examples, the processor 116 of the AR device 104 may switch ON the AR display device 112 in response to determining that the position of the AR device 104 is outside a threshold position. For example, if the processor 116 determines that the distance between the AR device 104 and the computing device 102 is greater than a threshold position, or the angle of the AR device 104 relative to the computing device 102 is greater than a threshold angle, then the processor 116 of the AR device 104 may switch ON the AR display device 112. The processor 116 may cause the AR display device 112 to render display data received from the computing device 102.

In some examples, the AR device 104 may send an instruction to the computing device 102 to switch the state of the display device 106 based on a position determination made by the AR device 104. In this case, it is the AR device 104, not the computing device 102, that is responsible for determining the relative positions of the computing device 102 and the AR device 104. The AR device 104 is also responsible for coordinating whether the display device 106 of the computing device 102 or the AR display device 112 is active (e.g., switched ON) or inactive (e.g., switched OFF).

In some examples, the AR device 104 may detect the presence of a second AR device (not shown). The AR device 104 may generate a user alert in response to detecting the second AR device. For example, when a user is wearing the AR device 104 and actively observing display data presented by the AR display device 112, the user may not be fully aware of their surroundings. To reduce the likelihood of a collision with another user of a second AR device, the AR device 104 may monitor the position of the other AR devices within the vicinity of the AR device 104. For example, the AR device 104 may use UWB technology to determine the distance between the AR device 104 and a second AR device. If a second AR device is within a threshold distance from the AR device 104 while the AR display device 112 is active (e.g., switched ON), then the processor 116 of the AR device 104 may generate a user alert. In some examples, the user alert may include a sound generated by the AR device 104 or a visual alert (e.g., a text-based message, a graphic image) displayed by the AR display device 112 indicating the presence of the second AR device.

Figure 3:
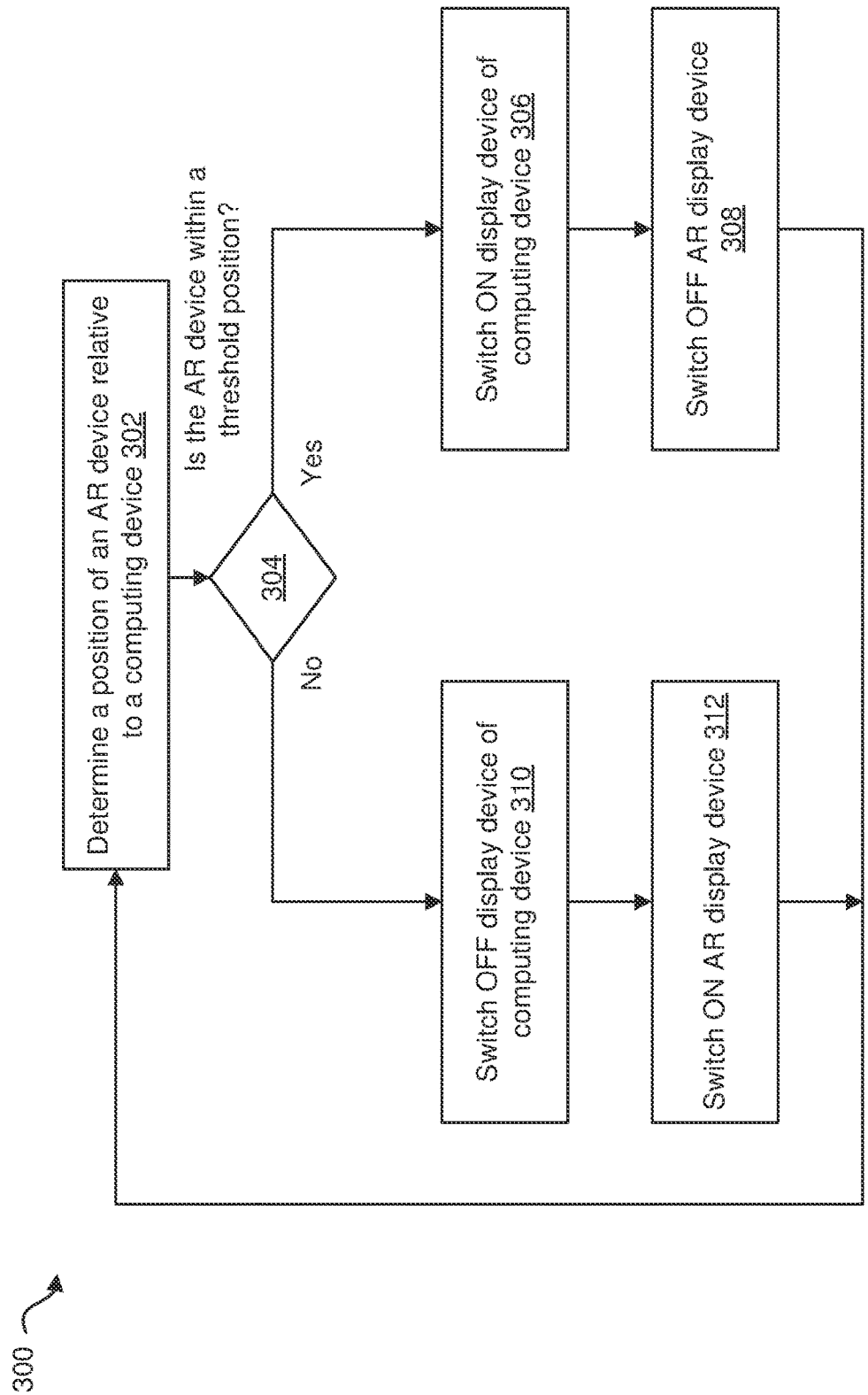
FIG. 3 is a flowchart illustrating a method for position-based switching of display devices, according to an example.

FIG. 3 is a flowchart illustrating a method 300 for position-based switching of display devices, according to an example. The method 300 may be performed by either the computing device 102 or the AR device 104 as described in FIG. 1. For ease of description, the method 300 will be described as being performed by the computing device 102.

At 302, the computing device 102 may determine the position of the AR device 104 relative to the computing device 102. For example, using wireless signals communicated between the computing device 102 and the AR device 104, the computing device 102 may determine the distance and the angle of the AR device 104 relative to the computing device 102.

At 304, the computing device 102 may determine whether the AR device 104 is within a threshold position. For example, the computing device 102 may determine whether the distance of the AR device 104 is within (e.g., less than or equal to) a threshold distance. The computing device 102 may also determine whether the angle of the AR device 104 is within a threshold angle.

If the position of the AR device 104 is within a threshold position, then, at 306, the computing device 102 may switch ON the display device 106 of the computing device 102. The computing device 102 may render display data on the display device 106 for view by a user.

At 308, the computing device 102 may cause the AR device 104 to switch OFF the AR display device 112, For example, the computing device 102 may send an instruction to the AR device 104 to switch OFF the AR display device 112. The computing device 102 may then return, at 302, to monitoring the position of the AR device 104.

If, at 304, the computing device 102 determines that the position (e.g., distance or angle) of the AR device is outside the threshold position (e.g., threshold distance or threshold angle), then, at 310, the computing device 102 may switch OFF the display device 106 of the computing device 102.

At 312, the computing device 102 may switch ON the AR display device 112. For example, the computing device 102 may send an instruction to the AR device 104 to switch ON the AR display device 112.

Figure 4:
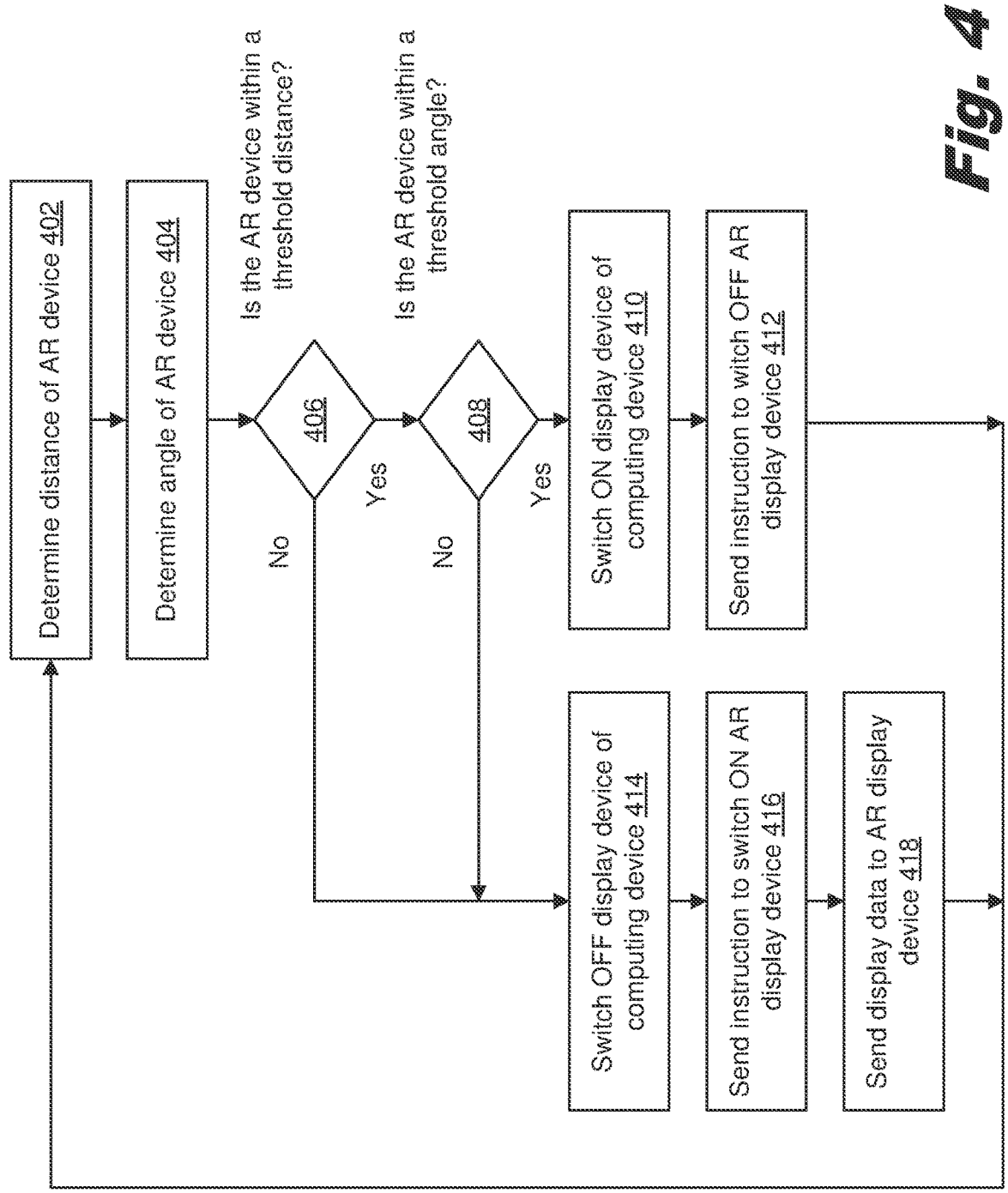
FIG. 4 is a flowchart illustrating another method for position-based switching of display devices, according to an example.

FIG. 4 is a flowchart illustrating another method 400 for position-based switching of display devices, according to an example. The method 400 may be performed by the computing device 102 as described in FIG. 1.

At 402, the computing device 102 may determine the distance of the AR device 104 relative to the computing device 102. For example, using wireless signals communicated between the computing device 102 and the AR device 104, the computing device 102 may determine the ToF or TDoF for the wireless signals. Using the ToF or TDoF, the computing device 102 may determine the distance (e.g., in centimeters) between the computing device 102 and the AR device 104.

At 404, the computing device 102 may determine the angle of the AR device 104 relative to the computing device 102. For example, using the phase difference between wireless signals sent by the AR device 104 and received by multiple antennas of the computing device 102, the computing device 102 may determine an AoA or AoD for the wireless signals. Using the AoA or AoD, the computing device 102 may determine the angle of the AR device 104 relative to the computing device 102.

At 406, the computing device 102 may determine whether the AR device 104 is within a threshold distance. For example, the computing device 102 may determine whether the distance of the AR device 104 is less than or equal to a threshold distance. If the AR device 104 is within the threshold distance (406 YES), then the computing device 102 may determine, at 408, whether the AR device 104 is within a threshold angle. For example, The computing device 102 may also determine whether the angle of the AR device 104 is within a threshold angle. For example, the computing device 102 may determine whether the absolute value of the angle of the AR device 104 relative to the computing device 102 is less than or equal to the threshold angle.

If the angle of the AR device 104 is within a threshold angle (408 YES), then, at 410, the computing device 102 may switch ON the display device 106 of the computing device 102. At 412, the computing device 102 may send an instruction to switch OFF the AR display device 112. In some examples, the computing device 102 may suspend the transmission of display data to the AR device 104. The computing device 102 may then continue, at 402, to monitor the distance and angle of the AR device 104.

If the computing device 102 determines that the AR device 104 is not within the threshold distance (406 NO), or the computing device 102 determines that the AR device 104 is not within the threshold angle (408 NO), the computing device 102 may, at 414, switch OFF the display device 106 of the computing device 102. At 416, the computing device 102 may send an instruction to the AR device 104 to switch ON the AR display device 112. At 418, the computing device 102 may send display data (e.g., a video stream) to the AR device 104 for display by the AR display device 112. The computing device 102 may then continue, at 402, to monitor the distance and angle of the AR device 104.

The preceding description has been presented to illustrate and describe examples of the principles described. This description is not intended to be exhaustive or to limit these principles to any precise form disclosed. Many modifications and variations are possible in light of the above teaching

What is claimed is:
1. An augmented reality (AR) device, comprising:
an AR display device to render display data;

a wireless communication device to transmit and receive wireless signals; and a processor to:
determine, based on the wireless signals communicated with a computing device, a position of the AR device relative to the computing device; and
switch, in response to determining the position, an activity state of the AR display device,
wherein the AR display is to send, to the computing device in response to determining the position, an instruction that causes the computing device to switch an activity state of a display device in the computing device.

2. The AR device of claim 1, wherein the position comprises a distance of the AR device from the computing device.

3. The AR device of claim 1, wherein the position comprises an angle of the AR device relative to the computing device.

4. The AR device of claim 1, wherein the processor is to switch OFF the AR display device in response to determining that the position is within a threshold position.

5. The AR device of claim 4, wherein the processor is to:
switch ON the AR display device in response to determining that the position is outside the threshold position.

6. The AR device of claim 1, wherein the wireless communication device comprises an ultra-wideband radio device.

7. The AR device of claim 1, wherein the processor is to:
generate a user alert in response to detecting that a second AR device is within a threshold distance from the AR device while the AR display device is active.

8. The AR device of claim 1, wherein the activity state of the AR display device refers to whether the AR display device is ON or OFF.

9. The AR device of claim 1, wherein the processor is to cause, in response to switching the AR display device ON, the AR display device to render display data received from the computing device.

10. The AR device of claim 1, wherein the activity state of the display device in the computing device refers to whether the display device in the computing device is ON or OFF.

11. The AR device of claim 1, wherein the instruction causes the computing device to switch, from ON to OFF, the activity state of the display device in the computing device.

12. A computing device comprising:
a display device to render display data;
a wireless communication device to transmit and receive wireless signals with an augmented reality (AR) device comprising an AR display device; and
a processor to:
determine a position of the AR device relative to the computing device based on the wireless signals communicated with the AR device; and
switch an activity state of the display device based on the determined position of the AR device relative to the computing device,
wherein in response to determining that the position of the AR device is within a threshold position, the processor is to:
switch ON the display device; and
send an instruction to the AR device to switch OFF the AR display device.

13. The computing device of claim 12, wherein in response to determining that the position of the AR device is outside the threshold position, the processor is to:
switch OFF the display device;
send an instruction to the AR device to switch ON the AR display device; and
send display data to the AR device to render using the AR display device.

14. A system comprising:
an augmented reality (AR) device, comprising:
an AR display device; and
a first wireless communication device to transmit and receive wireless signals; and
a computing device, comprising:
a display device to render display data;
a second wireless communication device to transmit and receive wireless signals with the AR device; and
a processor to:
determine a distance of the AR device from the computing device based on the wireless signals;
determine an angle of the AR device relative to the computing device based on the wireless signals; and
switch an activity state of the display device and the AR display device based on the determined distance and the angle of the AR device relative to the computing device,
wherein in response to determining that the distance of the AR device is within a threshold distance and the angle of the AR device is within a threshold angle, the processor is to:
switch ON the display device; and
send an instruction to the AR device to switch OFF the AR display device.

15. The system of claim 14, wherein in response to determining that the distance of the AR device is greater than the threshold distance, or the angle of the AR device is greater than a threshold angle, the processor is to:
switch OFF the display device of the computing device;
send an instruction to the AR device to switch ON the AR display device; and
send the display data from the computing device to the AR device to render using the AR display device.

16. The system of claim 15, wherein the display data comprises a video stream of a desktop image from the computing device.

17. The system of claim 14, wherein the processor is to periodically request the second wireless communication device to calculate the distance and the angle of the AR device relative to the computing device.

* * * * *